United States Patent
Mees

(10) Patent No.: US 10,639,565 B2
(45) Date of Patent: May 5, 2020

(54) METHOD FOR PRODUCING A FILTER ELEMENT

(75) Inventor: Harald Mees, Lebach (DE)

(73) Assignee: HYDAC FILTERTECHNIK GMBH, Sulzbach/SAAR (DE)

(*) Notice: Subject to any disclaimer, the term of this patent is extended or adjusted under 35 U.S.C. 154(b) by 1317 days.

(21) Appl. No.: 13/261,429

(22) PCT Filed: Jan. 25, 2011

(86) PCT No.: PCT/EP2011/000283
§ 371 (c)(1),
(2), (4) Date: Sep. 11, 2012

(87) PCT Pub. No.: WO2011/113505
PCT Pub. Date: Sep. 22, 2011

(65) Prior Publication Data
US 2013/0015121 A1   Jan. 17, 2013

(30) Foreign Application Priority Data

Mar. 17, 2010  (DE) .................. 10 2010 001 722

(51) Int. Cl.
| | |
|---|---|
| *B01D 29/31* | (2006.01) |
| *B23K 26/20* | (2014.01) |
| *B01D 29/11* | (2006.01) |
| *B01D 46/24* | (2006.01) |
| *B29C 63/06* | (2006.01) |
| *B01D 29/21* | (2006.01) |

(Continued)

(52) U.S. Cl.
CPC ............ *B01D 29/111* (2013.01); *B01D 29/21* (2013.01); *B01D 46/0001* (2013.01); *B01D 46/2411* (2013.01); *B29C 63/06* (2013.01); *B29C 53/38* (2013.01); *B29C 65/08* (2013.01); *B29C 65/16* (2013.01); *B29C 65/168* (2013.01); *B29C 65/4815* (2013.01); *B29C 65/5057* (2013.01); *B29C 66/1122* (2013.01); *B29C 66/4322* (2013.01); *B29L 2031/14* (2013.01)

(58) Field of Classification Search
CPC .... B29C 66/4322; B29C 63/06; B01D 29/111
USPC ................................ 210/497.01; 219/121.64
See application file for complete search history.

(56) References Cited

U.S. PATENT DOCUMENTS

| | | |
|---|---|---|
| 3,306,794 A | 2/1967 | Humbert, Jr. |
| 3,397,793 A | 8/1968 | MacDonnell |
| (Continued) | | |

FOREIGN PATENT DOCUMENTS

EP           1 015 095 B1     7/2000

*Primary Examiner* — Michael N Orlando
*Assistant Examiner* — Marta S Dulko
(74) *Attorney, Agent, or Firm* — Wenderoth, Lind & Ponack, L.L.P.

(57) ABSTRACT

A method for producing a filter element for filtering fluids, such as hydraulic fluids, lubricants or fuels, includes the following steps: a) providing at least one section of a filter mat web (14) made of one or more layers of at least one filter medium; b) connecting the ends of the at least one section to form an annular body (12) and placing that annular body onto a support pipe (16); c) wrapping at least one cutout of a film web (8) around the outside of the annular body (12) located on the support pipe (16) and d) placing end areas (24) of the at least one cutout of the film web (8) one on top of the other and connecting the overlapping end areas (24).

16 Claims, 3 Drawing Sheets

(51) Int. Cl.
*B01D 46/00* (2006.01)
*B29C 65/00* (2006.01)
*B29C 65/08* (2006.01)
*B29C 53/38* (2006.01)
*B29L 31/14* (2006.01)
*B29C 65/50* (2006.01)
*B29C 65/16* (2006.01)
*B29C 65/48* (2006.01)

(56) References Cited

U.S. PATENT DOCUMENTS

| | | | |
|---|---|---|---|
| 3,899,913 A * | 8/1975 | Schlosser | B29C 63/06 |
| | | | 156/213 |
| 5,814,219 A | 9/1998 | Friedmann et al. | |
| 6,863,758 B1 * | 3/2005 | Altmeyer et al. | 156/91 |
| 2008/0276584 A1 * | 11/2008 | Driesen | 55/502 |

\* cited by examiner

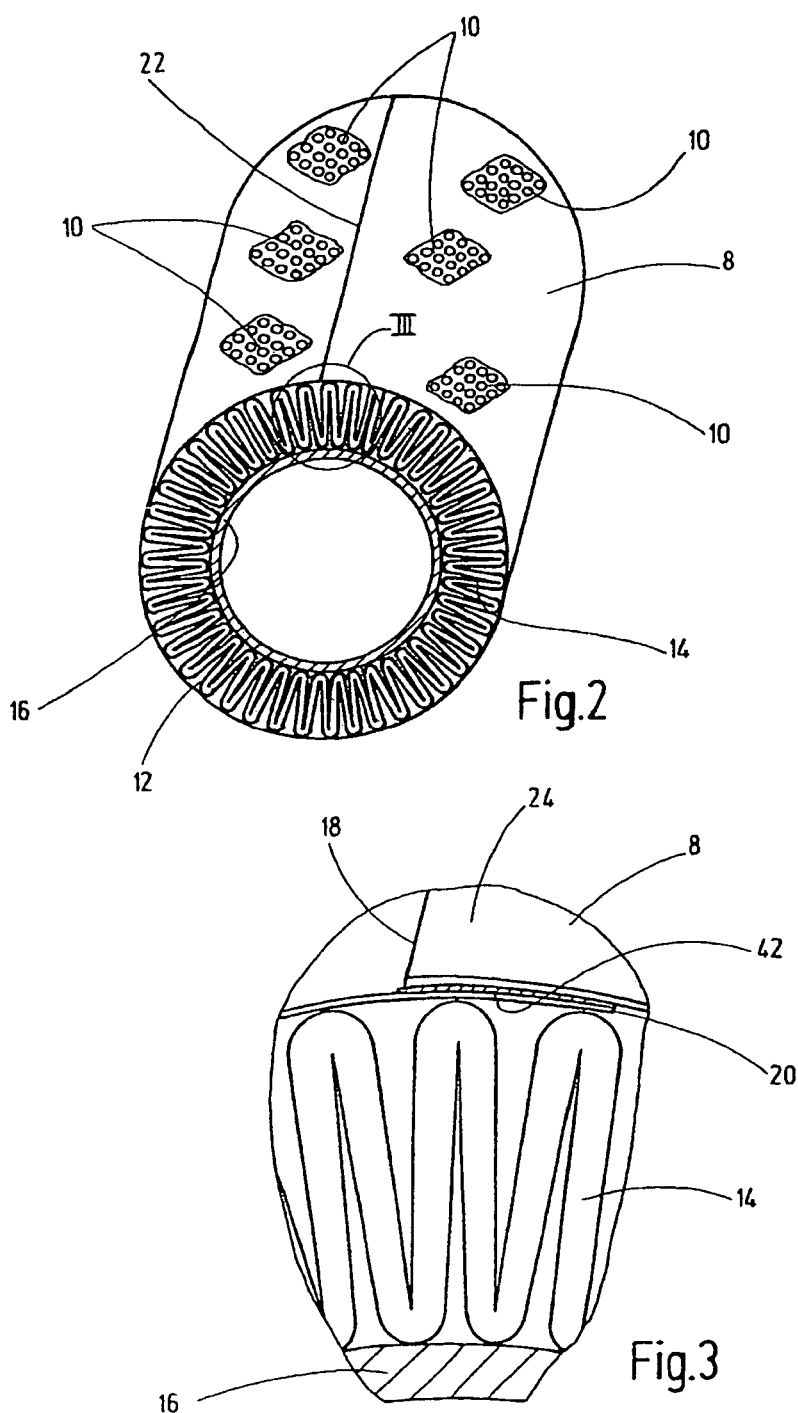

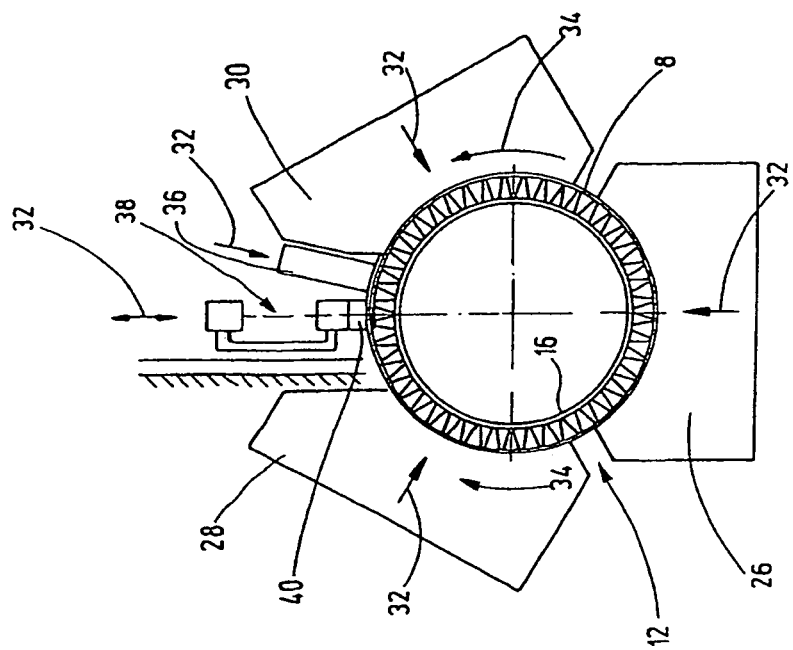
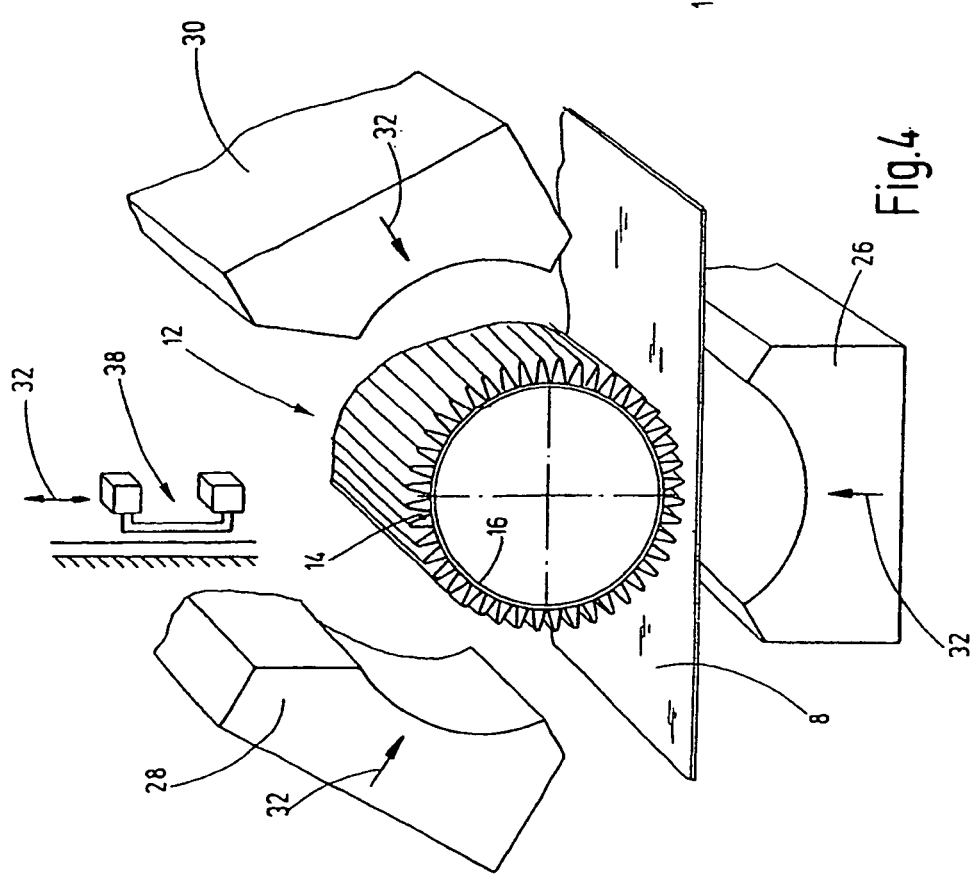

METHOD FOR PRODUCING A FILTER ELEMENT

FIELD OF THE INVENTION

The invention relates to a method for producing a filter element for filtering fluids, such as hydraulic fluids, lubricants, or fuels. The method comprises the steps of: providing at least one section of a filter mat web made of one or more layers of at least one filter medium; connecting the ends of the at least one section to form an annular body; and placing the annular body onto a support tube.

BACKGROUND OF THE INVENTION

Filter elements used in industrial systems to remove the impurities from fluids that are used in the ongoing operations are known from a number of prior art embodiments. For example, EP 1 015 095 B1 shows an advantageous design that has become very popular and is used extensively in pertinent systems. If in operation the filter mat becomes completely clogged with impurities, the filter element has to be changed for a new and unconsumed filter element. In light of the extensive use of such filter elements, having a large quantity of filter elements is required for the initial setup and replacement. Such filter elements can be referred to as "mass produced articles." Hence, a simple and efficient production of the filter elements is of considerable economic importance.

According to the state of the art described in document EP 1 015 095 B1, the filter element is provided with an outer sleeve made of a perforated film web and is produced such that a closed cylinder is made of a film web forming the outer sleeve. In this case, the overlapping ends of the film web are connected by a longitudinal weld. Then, the annular body is introduced into the cylindrical outer sleeve. To facilitate the introduction, the pleats are gathered together at the frontal end of the annular body such that the result is an insert cone that facilitates the introduction into the cylindrical outer sleeve.

SUMMARY OF THE INVENTION

An object of the present invention is to provide an improved method permitting production of such filter elements in a very efficient and economical way.

The present invention basically achieves this object with a method where an outer sleeve of the filter element is formed on a pre-assembled annular body made of a pleated filter mat web and located on an inner support tube. At least one initially flat blank of a film web is placed around the annular body. Thereafter, the overlapping end areas are connected together.

The inventive procedure, wherein the film web is placed around the exterior of the annular body and only then is the connecting longitudinal weld formed, constitutes a simplification compared to the prior art. This simplification in turn leads to a reduction in the production costs. The end areas of the film web or more specifically the end areas of the at least one blank of the film web are typically connected together by forming a longitudinal weld. Depending on the filter element to be produced, the support tube can have fluid openings, and/or the film web can be made with perforations.

An especially advantageous approach may be to proceed such that the at least one blank of the film web is clamped around the annular body before the end areas of the blank are connected. As a result, the prestress of the filter mat is no longer dependent on the position of tolerance (pleat height) of the filter mat, resulting in an additional simplification of the production. Since no friction is between the outer sleeve and the filter mat because of the elimination of an axial insert movement despite the prestress achieved in the finished state, no abrasion is present. Moreover, an after-treatment is not needed, such as in the form of shrinking on the film, to achieve a desired prestress of the outer sleeve, so that no thermal degradation of the filter mat web occurs.

Preferably, the connecting of the overlapping end areas is carried out by a thermal joining procedure. If the film that forms the outer sleeve is made of a polyamide compound or a polyethylene compound or if the film is made of polyester or epoxy polyurethane or a similar synthetic plastic material with good hot adhesive properties, joining can then be carried out by an ultrasonic welding process or by a welding laser.

In the latter case, the laser welding operation can be carried out using an additional laser-impermeable barrier layer, if the material of the film itself does not form a suitable laser-impermeable barrier layer.

Given suitable materials, the welding operation can be carried out without a welding filler, whereas as an alternative a welding filler is inserted between the overlapping end areas before the welding operation.

In this context, especially advantageously, a film that serves as the laser-impermeable barrier layer can be used as the welding filler.

One approach with respect to wrapping the annular body with the film can be to use movable molded bodies that act on the initially flat film web by infeed movements and that form the film web around the annular body. In this case, the infeed movements can be moved with the components extending in the circumferential direction so that, when the film web is wrapped around the annular body, the film web is clamped.

The subject matter of the invention is also a filter element produced according to the method disclosed.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIG. 2 is a perspective view in the direction of the end section of the filter element of FIG. 1 that is depicted without the associated end caps;

FIG. 3 is a highly enlarged end elevational view of the area designated as III in FIG. 2;

FIG. 4 is a highly simplified, perspective view in schematic form of a processing system according to an exemplary embodiment of the invention, with the molded bodies located in a starting position; and FIG. 5 is a front elevational view of the system of FIG. 4, with the molded bodies located in a closed working position in operating state.

DETAILED DESCRIPTION OF THE INVENTION

Figure 1:
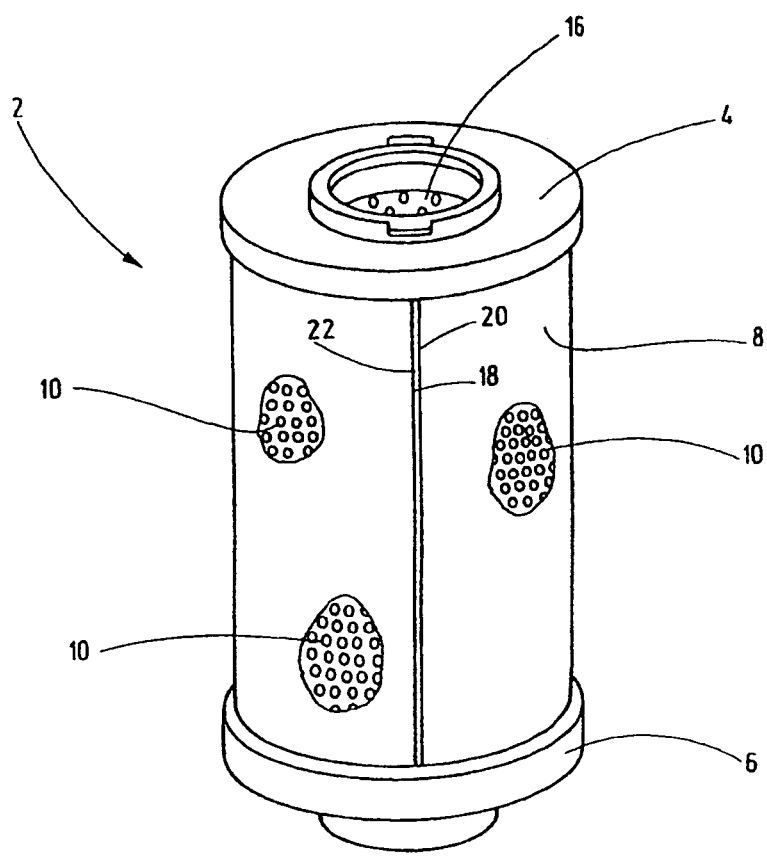
FIG. 1 is a perspective view of a filter element produced according to the method according to an exemplary embodiment of the invention.

The filter element 2, depicted in its entirety in FIG. 1, has an outer sleeve made of a perforated film web 8 and located between the end caps 4 and 6. These end caps 4, 6 are injection molded of a synthetic plastic material. The perforation of the film web 8 is indicated only in a few areas 10. The film web 8 surrounds an annular body 12 having a construction that is most easily discernible from FIGS. 2 and 3. As evident, the annular body 12 has a folded filter mat web 14 that is folded in the manner of pleats and that surrounds an inner support tube 16 having fluid openings. FIG. 3 shows that the ends 18 and 20 of the film web 8 are laid one on top of the other, so that an overlapping area 24 is formed. The formed outer sleeve is closed in a longitudinal weld 22 (see FIGS. 1 and 2).

FIGS. 4 and 5 are in each instance a highly simplified view in schematic form of a processing system for carrying out the method according to the invention. As clear from FIG. 4, the film web 8 is located initially in the form of a flat or planar blank below the pre-assembled annular body 12, comprising the filter mat 14 surrounding the support tube 16. The system has a movable lower molded body 26 and movable upper molded bodies 28 and 30. Then in FIG. 4, the film web 8 is moved upward by infeed fingers (not illustrated) and placed against the exterior of the annular body 12. Then, the lower molded body 26 is moved upward in the direction of the movement arrow 32, while the upper molded bodies 28 and 30 are moved—also in the direction of their allocated movement arrows 32—in the direction of the center of the annular body 12 until the system reaches the closed state shown in FIG. 5. In this state, the ends 18 and 20 of the film web 8 are placed, as shown in FIG. 3, one on top of the other such that the overlapping area 24 is formed, where a welding operation for forming a longitudinal weld 22 is carried out. Before this step takes place, that is, before the formed outer sleeve is closed, this outer sleeve is given a prestress, in that a tensile stress is produced in the film web 8 in the circumferential direction. This stressing can be done in any suitable way, for example, in that a tensioner (not illustrated) acts upon the ends 18 and 20 of the film web prior to the overlapping; or when the upper molded bodies rest against the exterior of the film web in the closed position, as shown in FIG. 5. The upper molded bodies 28 and 30 perform an additional movement in the direction of the curved arrows 34, by which the film web 8 is clamped.

Before the actual welding operation, the ends 18 and 20 of the film web 8 are held together preferably by one or more pressure-applying pieces 36. In the example described in the present case, joining is done by laser welding using a laser unit 38 that can be moved according to the movement arrow 32. The drawing in FIG. 5 shows that the laser unit 38 has a pressure-applying body 40 on the front end that can be moved up against the overlapping area 24. This pressure-applying body, which is intended for laser light transmissive Plexiglas, compresses the welding area during the welding operation.

In the case of a film web 8 that is made of a synthetic plastic material that is not transmissive to laser light, and the film web 8 itself forms a laser-impermeable barrier layer that is appropriate for laser welding. The welding operation can be carried out without a welding filler, if the synthetic plastic material lends itself to a hot sealing procedure. Without a welding filler, the joining can also be performed by ultrasonic welding instead of laser welding. However, a welding filler can also be used, as in the case of the laser welding, for ultrasonic welding to carry out a hot melt adhesive process. For the laser welding operation, such a welding filler 42 in FIG. 3, can be inserted in the form of a strip of film in the overlapping area 24 between the ends 18, 20 of the film web 8. In this case, film web 8 can be a film made of polybutylene terephthalate. Such a PBT film, which is sold under the tradename "Vestodur®," can form a kind of hot melt adhesive during the thermal welding operation. In addition, that filler can serve as the laser-impermeable barrier layer that is opaque to laser light, if the welding operation is carried out by laser welding.

The disclosed method provides the use of sections of a filter mat web 14 made of one or more layers of filter media that are folded in the manner of pleats. In this case, the one layer can be a multilayer, where the stacked layers are laminated together and form together a tight composite.

The barrier layer under discussion can also be produced by depositing vaporized metals (sputtering) on the film or can be partially printed on said film.

While one embodiment has been chosen to illustrate the invention, it will be understood by those skilled in the art that various changes and modifications can be made therein without departing from the scope of the invention as defined in the appended claims.

What is claimed is:

1. A method for producing a filter element for filtering fluids, comprising the steps of:
    providing at least one section of a filter mat web made of at least one layer of at least one filter medium;
    connecting ends of the at least one section forming an annular body;
    placing the annular body onto a support tube;
    wrapping an exterior of the annular body, after being placed on the support body, with at least one blank of a film web;
    placing a first end area of the at least one blank of the film web on top of a second end area of the at least one blank of the film web to provide overlapping end areas;
    clamping the at least one blank of the film web around the annular body while the overlapping end areas are unconnected and producing a tensile stress in the film web in a circumferential direction with a tensioner acting by applying forces on ends of the film web in a direction of the overlapping of the ends of the film web; and
    connecting the overlapping end areas after the clamping of the at least one blank of the film web around the annular body and after producing the tensile stress by welding while the overlapping end areas are pressed against one another by feeding in pressure-applying pieces during welding.

2. A method according to claim 1 wherein
    the film web is made of a weldable synthetic plastic material, with the overlapping end areas being connected by welding.

3. A method according to claim 1 wherein
    the welding is performed by laser welding with a laser-impermeable barrier layer.

4. A method according to claim 2 wherein
    the welding is carried out without a welding filler.

5. A method according to claim 2 wherein
    a welding filler is inserted between the overlapping end areas before the welding.

6. A method according to claim 3 wherein
    the laser-impermeable barrier layer comprises a film inserted between the overlapping end areas and is used as a welding filler.

7. A method according to claim 1 wherein
    the wrapping of annular body with the at least one blank of the film web is performed by infeed movements of molded bodies acting on the at least one blank of the film web that is initially flat.

8. A method for producing a filter element for filtering fluids, comprising the steps of:
- providing at least one section of a filter mat web formed of at least layer of at least one filter medium, the at least one section having ends,
- connecting the ends of the at least one section to form an annular body,
- placing the annular body on a support tube,
- wrapping at least one blank of a film web on an exterior of the annular body with the support tube therein, the at least one blank of the film web having end areas,
- placing a first end areas one on top of another to provide overlapping end areas,
- clamping the at least one blank of the film web around the annular body while the overlapping end areas are unconnected and producing a tensile stress in the film web in a circumferential direction thereof with upper mold bodies resting against an exterior of the film web in a closed position of the upper mold bodies and with the upper mold bodies moving in a circumferential direction of the exterior of the film web and in a direction of the overlapping of the ends of the film web, and
- connecting the overlapping end areas after producing the tensile stress by welding while the overlapping end areas are pressed against one another by feeding in pressure-applying pieces.

9. A method according to claim 8 wherein the film web is made of a synthetic plastic material that is weldable.

10. A method according to claim 9 wherein the welding is by laser welding using a laser-impermeable barrier layer.

11. A method according to claim 9 wherein the overlapping end areas are welded without a welding filler.

12. A method according to claim 9 wherein a welding filler is inserted between the overlapping end areas, and the overlapping end areas are welded after insertion of the welding filler.

13. A method according to claim 10 wherein the laser-impermeable barrier layer is a film inserted between the overlapping end areas before the laser welding.

14. A method according to claim 8 wherein the at least one blank of the film web is wrapped about the annular body by infeed movements of molded bodies acting on the film web that is initially flat.

15. A method according to claim 8 wherein said film web is perforated.

16. A method according to claim 1 wherein said film web is perforated.

* * * * *